July 28, 1964

L. F. SHABRAM 3,142,602

APPARATUS FOR FORMING ARTICLES FROM A WEB

Filed Nov. 21, 1960

INVENTOR
LYLE F. SHABRAM
BY HIS ATTORNEYS
HARRIS, KIECH, RUSSELL & KERN

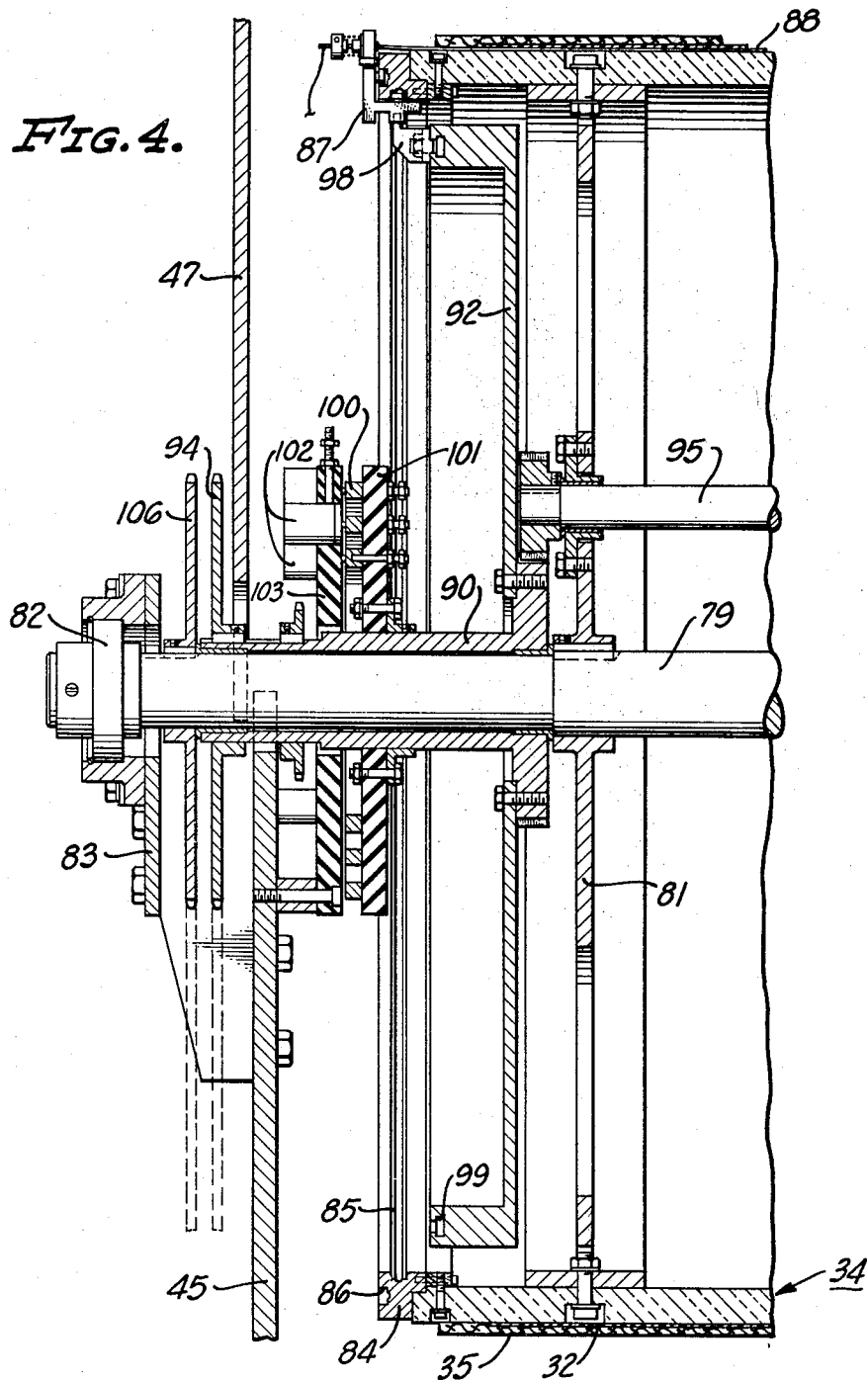

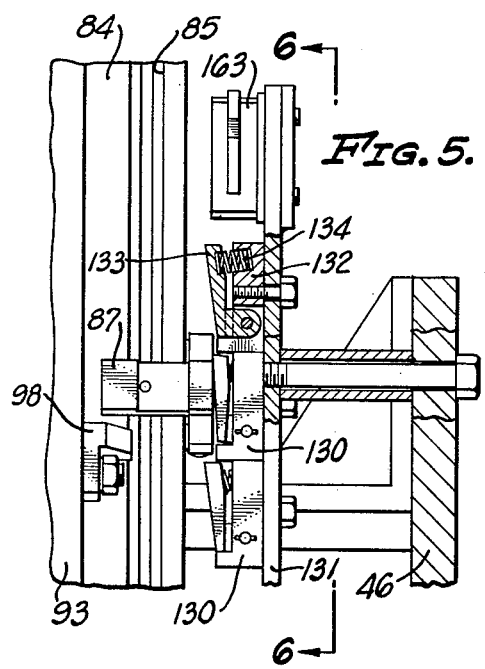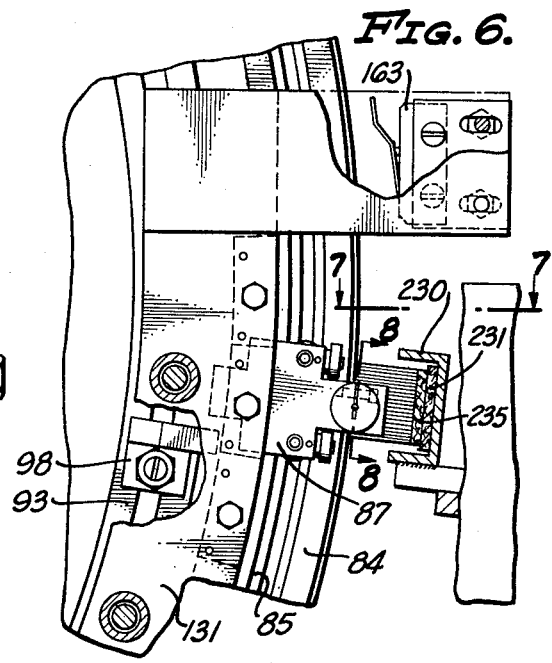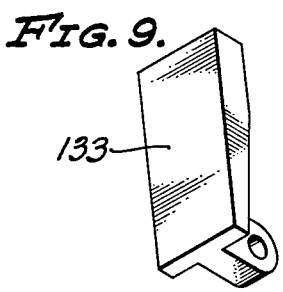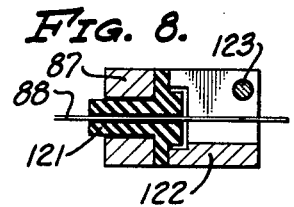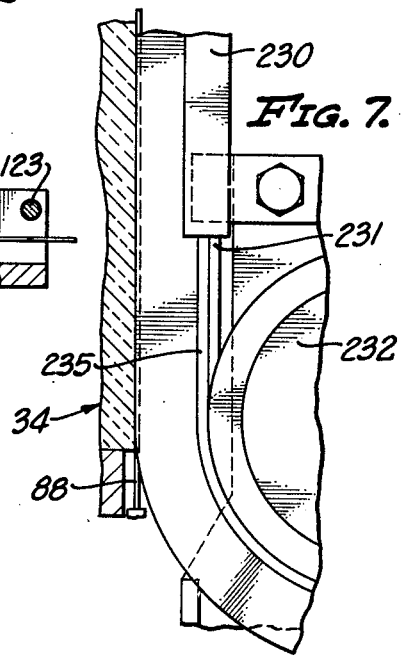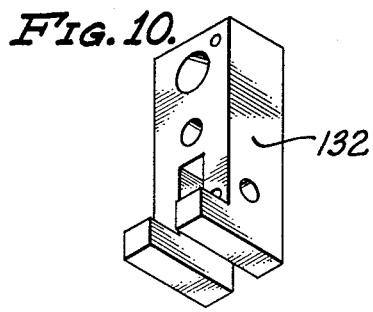

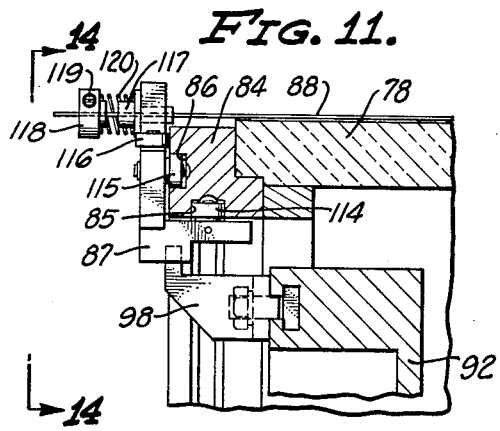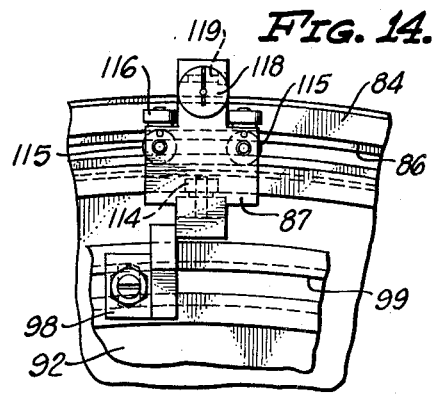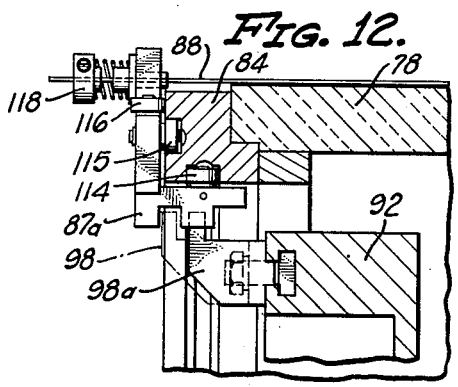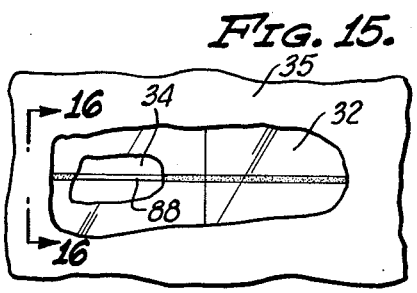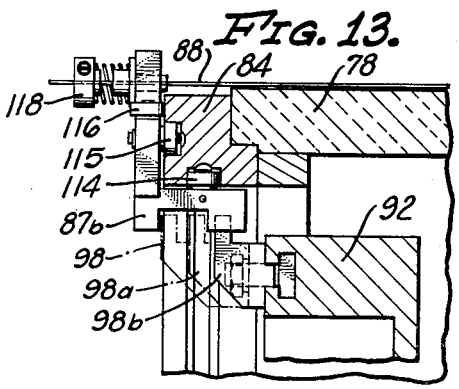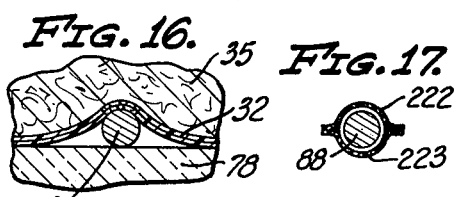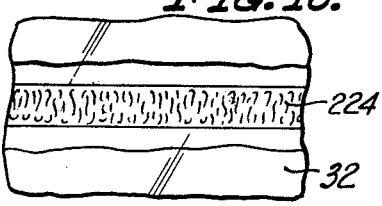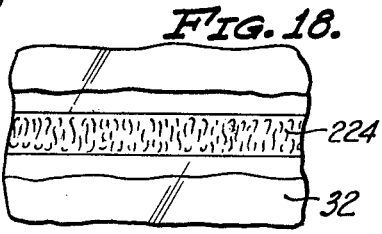

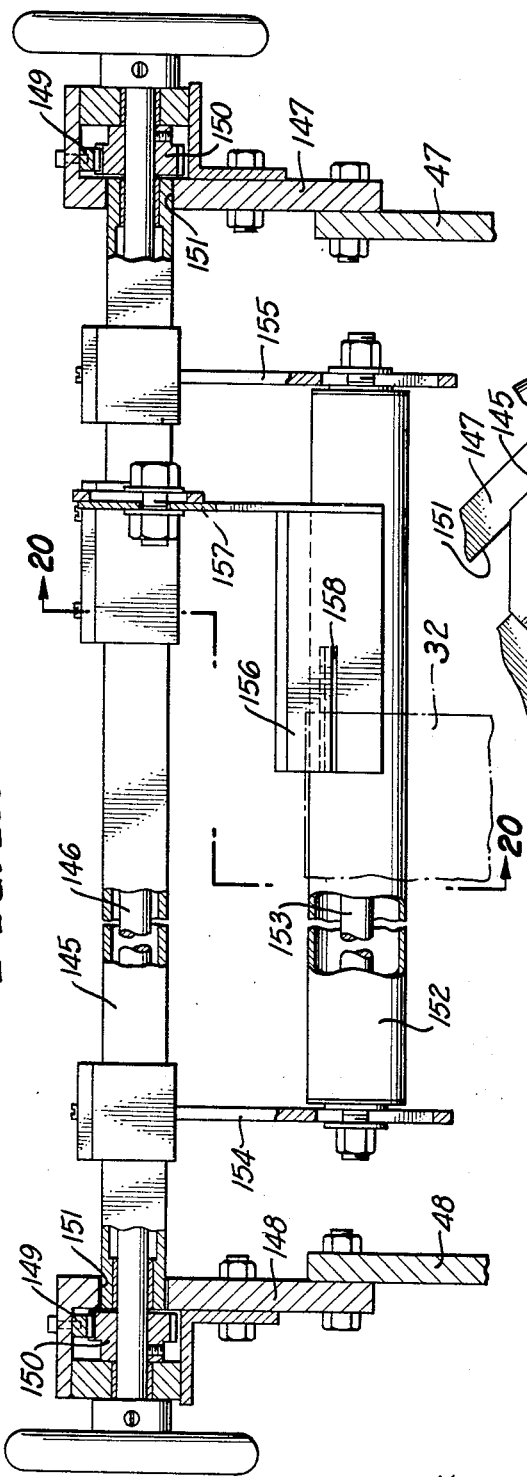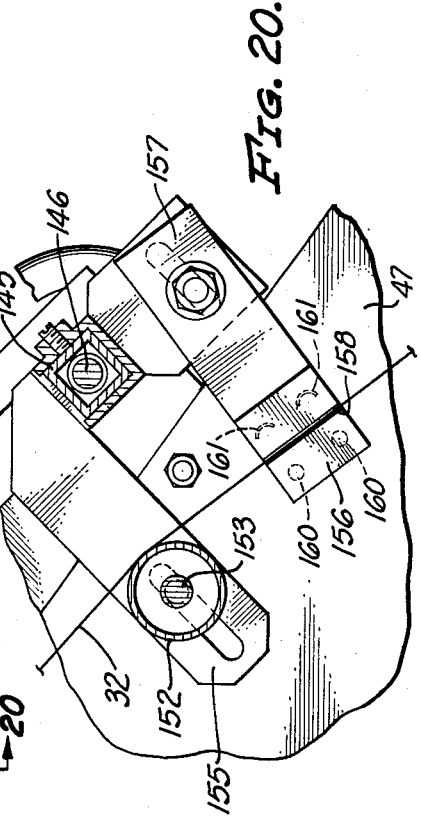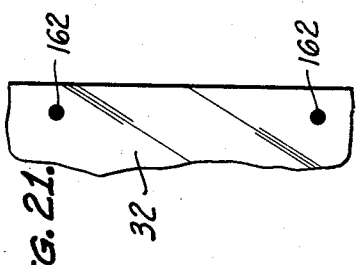

July 28, 1964   L. F. SHABRAM   3,142,602
APPARATUS FOR FORMING ARTICLES FROM A WEB
Filed Nov. 21, 1960   9 Sheets-Sheet 9
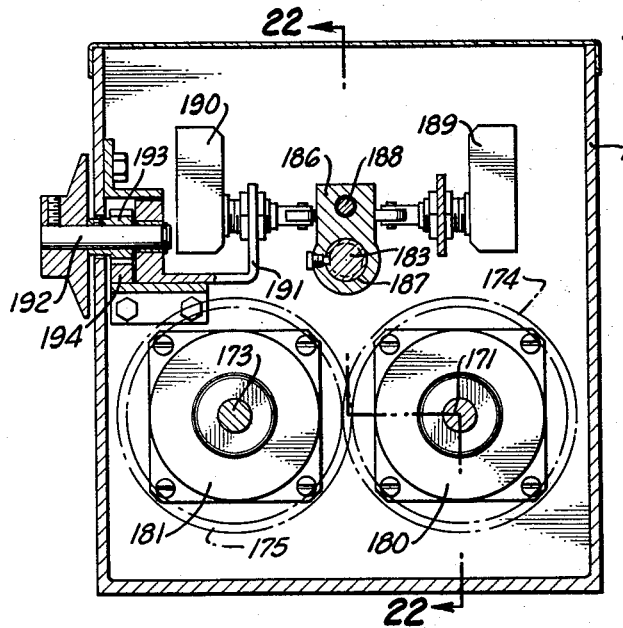
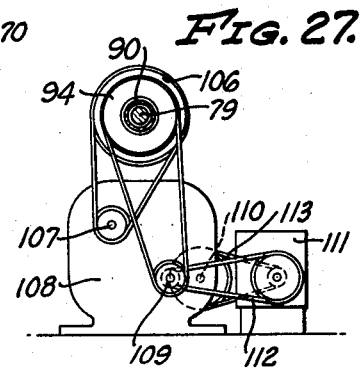
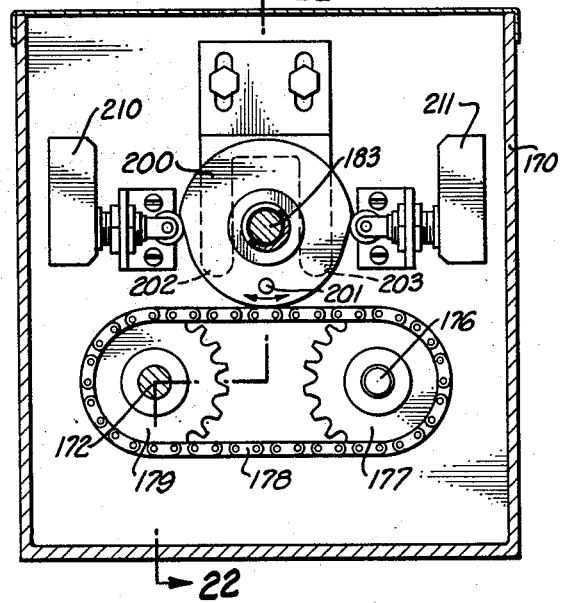
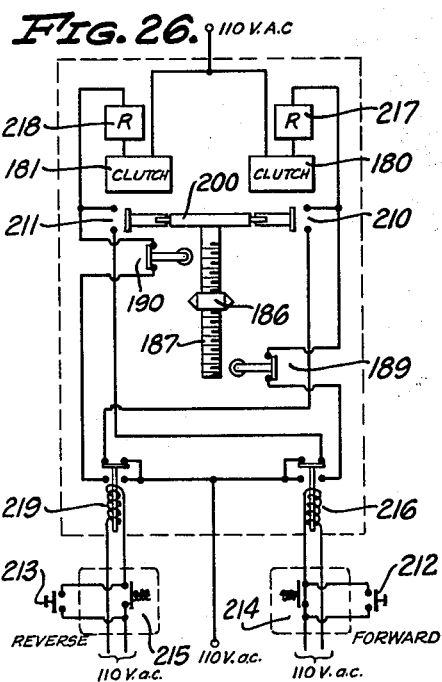
INVENTOR
LYLE F. SHABRAM
BY HIS ATTORNEYS
HARRIS, KIECH, RUSSELL & KERN United States Patent Office 3,142,602
Patented July 28, 1964

1

3,142,602
APPARATUS FOR FORMING ARTICLES
FROM A WEB
Lyle F. Shabram, Danville, Calif., assignor to Consolidated Thermoplastic Company, Stamford, Conn., a corporation of Delaware
Filed Nov. 21, 1960, Ser. No. 70,481
15 Claims. (Cl. 156—359)

This invention relates to apparatus for forming articles from a web such as a thermoplastic film.

It is an object of the invention to provide such apparatus for operation continuously and at a high speed. A further object is to provide apparatus which can be used for severing articles from the web and which can be used for sealing layers of the web to form articles. Another object is to provide such apparatus wherein the sealed article can be severed from the web or retained in the web as desired.

It is an object of the invention to provide apparatus for forming articles from a web in which the size of the articles can be changed without shutting down the apparatus. A further object is to provide such apparatus wherein the size can be varied continuously over the operating range of the machine. A further object is to provide such apparatus for use with preprinted or premarked material in which the apparatus includes means for maintaining the articles being formed in registry with the printing.

It is a specific object of the invention to provide an apparatus for forming articles from a web including inner and outer concentric members, means for rotating the members in the same direction at different rates of rotation with the inner member moving slower than the outer member, means for feeding the web of material to the outer member and clamping the web against the outer surface thereof during a portion of a revolution, a plurality of article-forming dies extending along the outer surface of the outer member with each of the dies driven by the inner member from a reference position in the direction of rotation of the members, and means for clamping each of the dies to the outer member in engagement with the web during said portion of a revolution so that a die is driven by the inner member at its reference position to be clamped against the outer member after which the die is carried by the outer member at a higher rate until released to lag behind both members returning to its reference position. A further object is to provide such an apparatus wherein the web of material is carried by a flexible belt with the web and belt wrapping around more than three-quarters of the outer member. A further object is to provide such apparatus wherein the speed of the inner member is variable with respect to that of the outer member for varying the spacing of the dies along the outer member. A further object is to provide such apparatus wherein the registration of the dies with a premarked web is controlled by varying the relative rates of rotation of the inner and outer members.

It is an object of the invention to provide such apparatus in which the web-carrying belt and the outer rotating member are driven directly from the power source and the inner rotating member is driven through a variable speed transmission permitting change of speed of the inner member without disturbing the motion of the outer member and belt. A further object is to provide a new and unique speed control unit for controlling the speed variations of the two rotating members.

It is a particular object of the invention to provide such apparatus wherein the article-forming dies are carried by carriages which ride on the outer member with the carriages being engageable with carriage-driving pegs carried on the inner member for moving the carriages at

2 the rate of the inner member. A further object is to provide such a structure wherein the article-forming dies are supported across the outer surface of the outer member by the carriages so as to be clamped to the outer member and, hence, moved at the rate of the outer member. A particular object is to provide such a structure wherein the article-forming dies comprise electrical resistance heating wires stretched between carriages positioned on opposing ends of the outer member.

It is an object of the invention to provide an apparatus for forming tearable seals in a thermoplastic web so that the articles are not severed at the time of formation but may easily be severed in subsequent handling. A further object is to provide such apparatus including a belt or pressure blanket having a fabric surface for pressing the web against the heat-sealing electrode. Another object is to provide such apparatus including a layer of high temperature-resistant fabric-reinforced plastic sheet between the electrode and the web to provide a complete seal between layers of the web and an intermittent severance along the seal.

It is an object of the invention to provide new and novel processes for heat sealing of thermoplastic webs producing heating and cooling at particular times in the sealing cycle. A further object is to provide a continuous process for sealing a laminar web of thermoplastic material at spaced locations including moving sealing electrodes along a closed path, moving the web along a first portion of the path, contacting the web with a pressure blanket to maintain the web in engagement with the electrodes along the first portion of the path, maintaining the electrodes free of the web during the remaining portion of the path, and heating the electrodes while traversing the remaining portion of the path to a temperature greater than that necessary to seal layers of the thermoplastic material but less than that necessary to maintain the sealing temperature while the pressure blanket is maintaining the web in engagement with an electrode. Another object is to provide such a process wherein the closed path is defined by a rotating drum with the web in contact with an electrode for more than three-quarters of a revolution to produce a complete seal during a revolution.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 4 is an enlarged sectional view taken along the line 4—4 of FIG. 2;

FIG. 5 is an enlarged sectional view taken along the line 5—5 of FIG. 2;

FIG. 6 is a sectional view taken along the line 6—6 of FIG. 5;

FIG. 7 is a sectional view taken along the line 7—7 of FIG. 6;

FIG. 8 is an enlarged sectional view taken along the line 8—8 of FIG. 6;

FIGS. 9 and 10 are isometric views of elements of the brake structure shown in FIG. 5;

FIGS. 11, 12 and 13 are enlarged partial sectional views showing engagement of the coded pegs and wire carriages;

FIG. 14 is a sectional view taken along the line 14—14 of FIG. 11;

FIG. 15 is a plan view of the outer drum with a portion of the belt and web broken away;

FIG. 16 is an enlarged sectional view taken along the line 16—16 of FIG. 15;

FIG. 17 is a sectional view similar to that of FIG. 16 showing an alternative form of heat-sealing electrode;

FIG. 18 illustrates a seal produced by the apparatus of the invention;

FIG. 19 is an enlarged sectional view taken along the line 19—19 of FIG. 1;

FIG. 20 is a sectional view taken along the line 20—20 of FIG. 19;

FIG. 21 is a view of a portion of the web showing registration marks thereon;

FIG. 24 is a sectional view taken along the line 24—24 of FIG. 23;

FIG. 25 is a sectional view taken along the line 25—25 of FIG. 23;

FIG. 26 is a schematic diagram of the speed control unit of FIGS. 22–25; and

FIG. 27 is an end view of the variable speed transmission showing the connections thereto.

Figure 1:
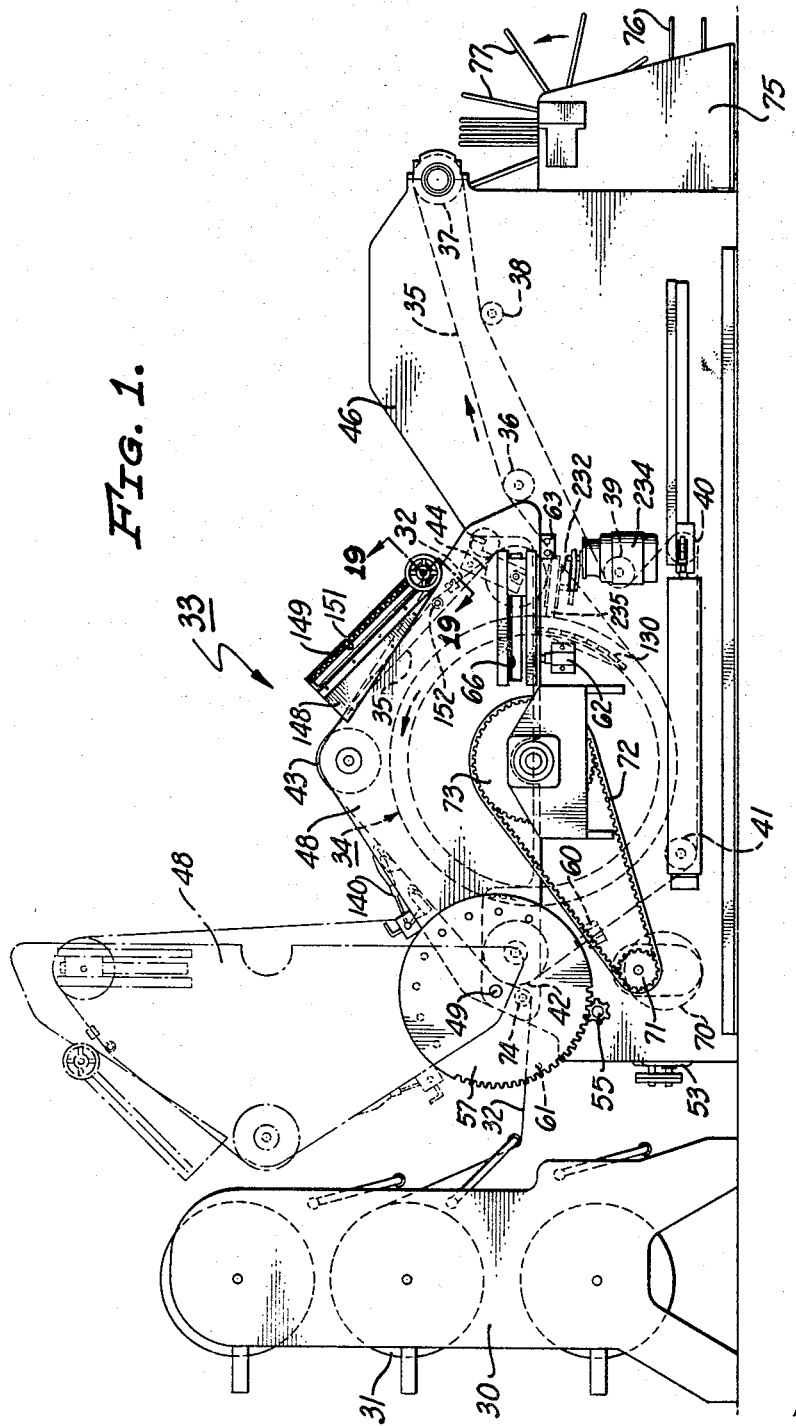
FIG. 1 is a side elevation of a preferred form of the apparatus of the invention.
Figure 2:
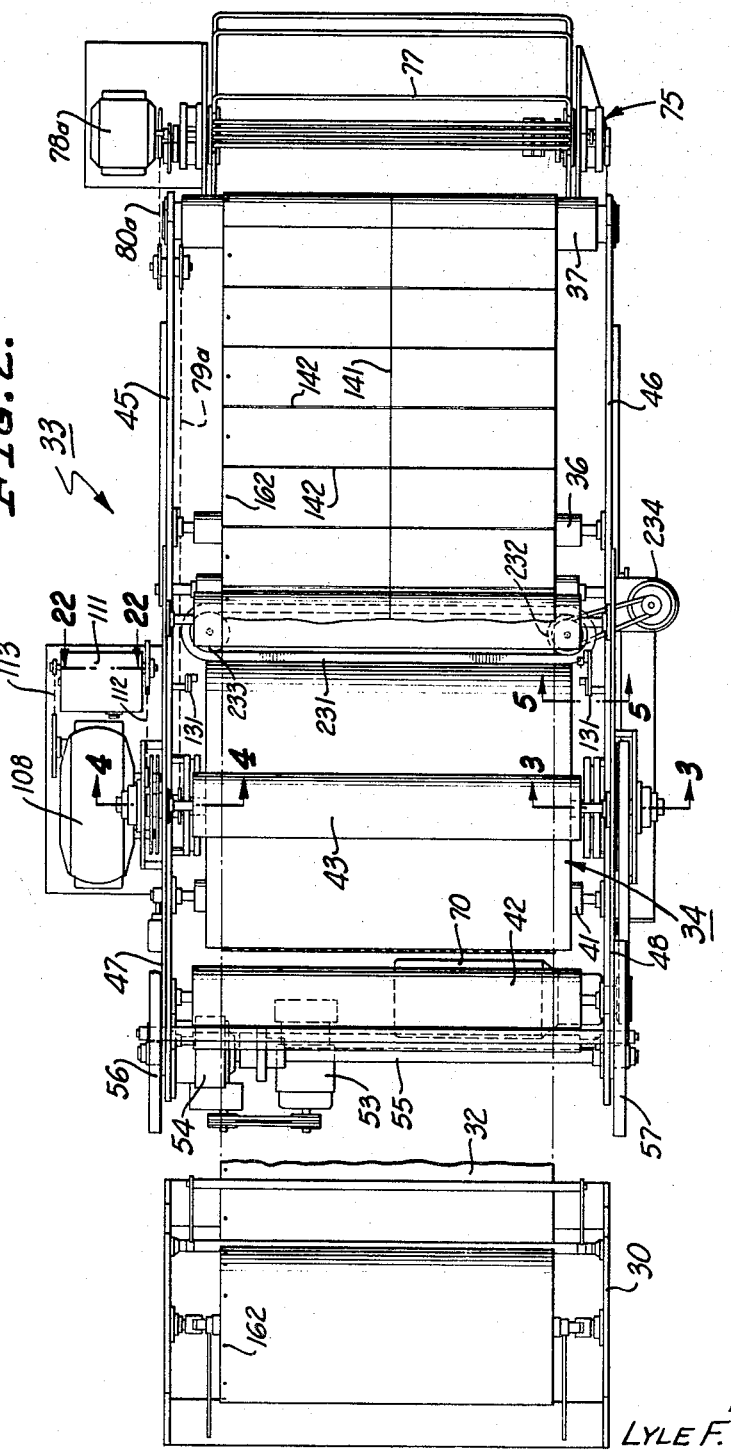
FIG. 2 is a plan view of the apparatus of FIG. 1.

The apparatus of the invention is illustrated herein in the form of a machine for making bags of thermoplastic material but, of course, is not limited to this particular article and may be used for making various articles. Referring to FIGS. 1 and 2, a roll stand 30 supports a roll 31 of material such as polyethylene film for feeding a web 32 of the material to a bag-making machine 33. The machine 33 includes a drum 34 and a flexible belt 35 with the belt running over the drum 34 and rollers 36, 37, 38, 39, 40, 41, 42, 43, 44.

The drum 34 and the rollers 36–41 are carried between vertical frame members 45, 46. The rollers 42, 43, 44 are carried between frame members 47, 48 which are pivoted to the frame members 45, 46, respectively, at a rod 49. The rollers 42, 43, 44 and the frame members 47, 48 may be raised to the position shown in phantom lines in FIG. 1 by means of a motor 53, a gear box 54, a drive shaft 55, and spur gears 56, 57, the spur gears being fixed to the frame members 47, 48, respectively. This pivoting assembly provides access to the drum 34 without disturbing the adjustment of the belt 35. A safety switch 60 is mounted on the frame member 46 for engagement by a pin 61 on the spur gear 57 when the pivoting asembly is in the fully raised position to stop the motor 53. Similarly, another switch 62 is mounted on the frame member 46 for engagement by the frame member 48 when the pivoting assembly is in the full down position to stop the motor. The frame member 48 rests on a bracket 63 fixed to the frame member 46 and a similar bracket is positioned on the opposite side of the machine.

The bearing supports for the roller 44 are carried in brackets on the frame members 47, 48, permitting the roller to move along slots 66 in the frame members for adjusting the wraparound of the belt, particularly when a drum 34 of a different diameter is substituted.

The drum 34 is driven from a motor 70 via a gear 71, a belt 72 and another gear 73. The web 32 of material passes an idler roller 74 and engages the belt 35 at the roller 42. The web is carried by the belt over rollers 43, 44 and around the drum 34. The web with the articles formed therein is moved from the drum 34 by the belt 35 over the roller 36 to the roller 37 at which point the web and/or the articles are removed from the belt by suitable means. In the particular embodiment shown herein, an article-stacking machine 75 is positioned below the roller 37 for removing the bags from the belt. The article-stacking machine 37 removes the bags from the underside of the belt at the roller 37 and deposits the bags on another belt 76, the individual bags being picked from the belt by arms 77 which move in a counterclockwise direction as shown in FIG. 1. The arms are driven through a variable speed transmission 78a from the drum 34 through a chain 79a and another chain 80a. The details of construction and operation of the stacking machine 75 are shown in my copending application entitled Stacking Machine, U.S. Patent No. 3,070,212, and assigned to the same assignee as the present application. Of course, any suitable apparatus may be used for removing the articles from the belt.

Figure 3:
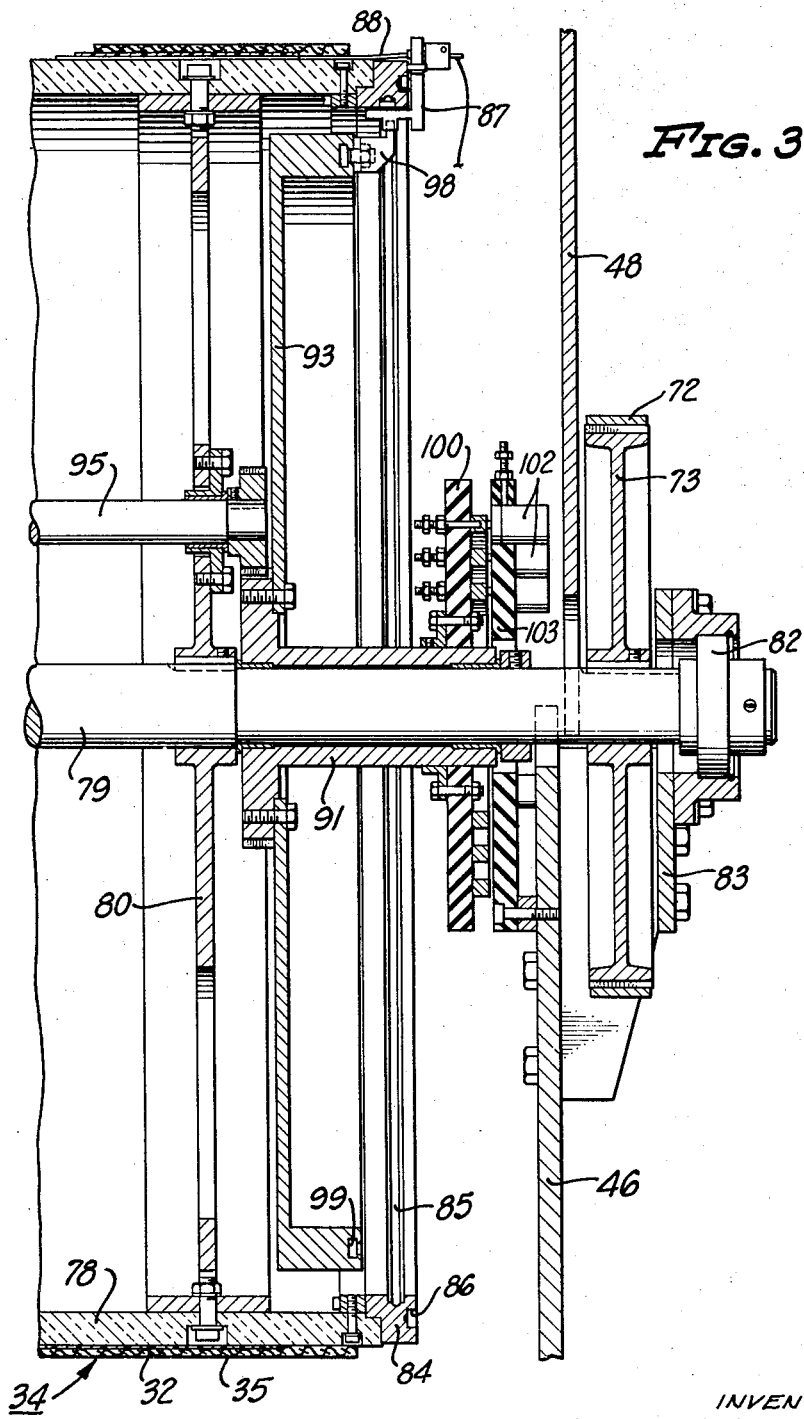
FIG. 3 is an enlarged section view taken along the line 3—3 of FIG. 2.
Figure 23:
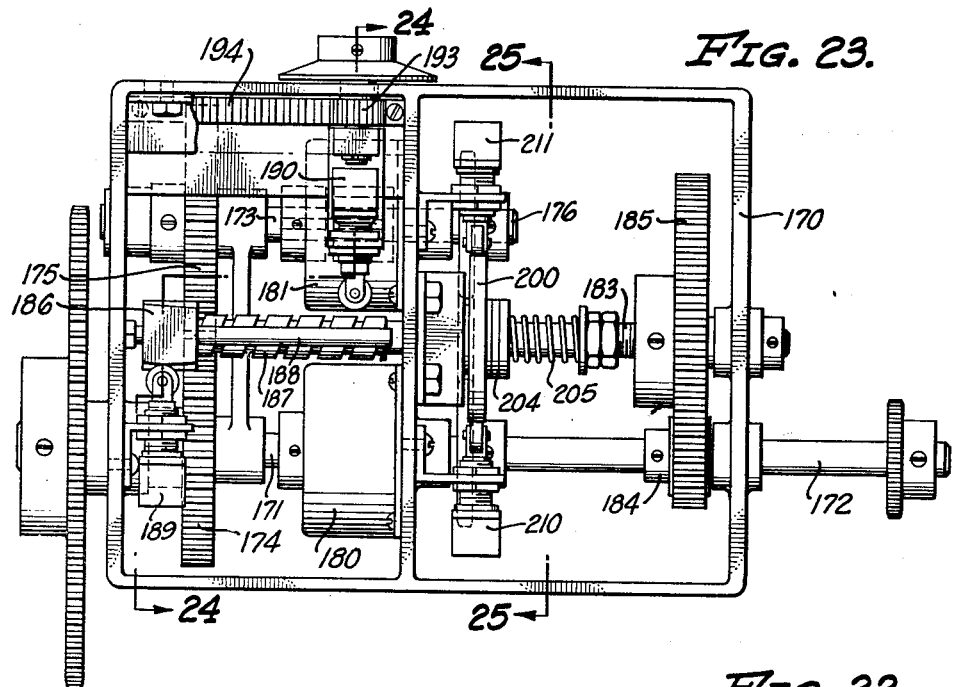
FIG. 23 is a plan view of the apparatus of FIG. 22 with the top cover removed.
Figure 22:
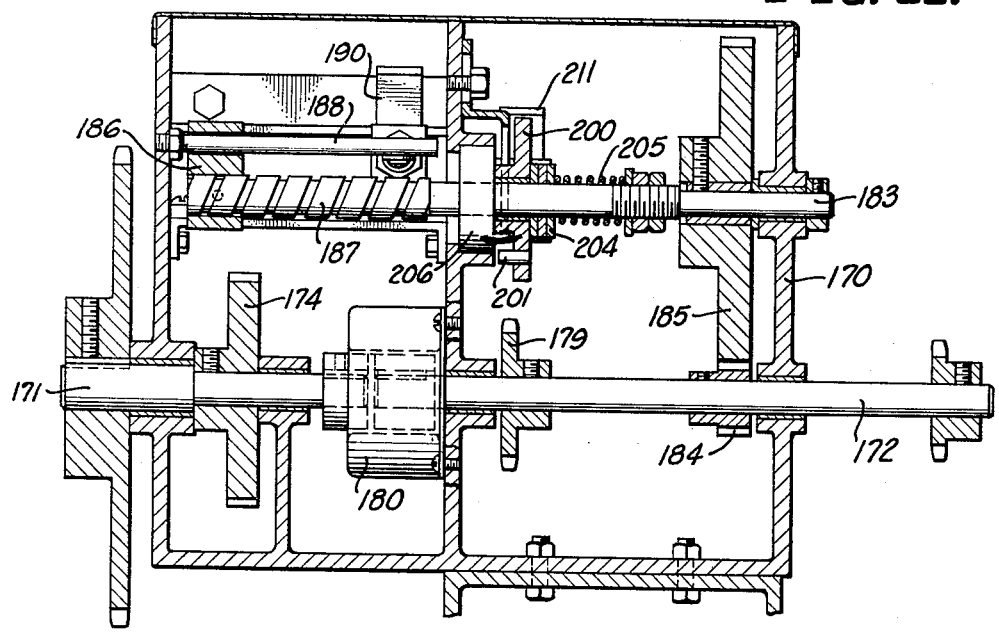
FIG. 22 is an enlarged sectional view taken along the line 22—22 of FIG. 2.

The construction of the drum 34 and associated components is shown in greater detail in FIGS. 3 and 4. The drum comprises a cylindrical shell 78 supported from a shaft 79 by flanges 80, 81. The shaft 79 runs in bearings 82 carried in brackets 83 mounted on the outer surfaces of the frame members 45, 46, respectively. The gear 73 is fixed to the shaft 79.

Carriage rings 84 are fixed in each end of the shell 78, each of the carriage rings having an internal groove 85 and an end groove 86. A plurality of electrode carriages 87 is slidably carried in each of the carriage rings 84. The details of this construction are best seen in FIGS. 11–14 and will be described below. In the particular embodiment of the invention shown herein, thirty of the carriages 87 are mounted in each carriage ring. The article-forming dies are supported at the outer surface of the shell 78 by the carriages 87. In this particular embodiment, the dies comprise electrodes or resistance wires 88 with a wire being positioned between corresponding carriages at each end of the drum.

The drum 34 is rotated at the desired speed by the motor 70 via the gear 73. Another member is positioned within the drum for rotation in the same direction as the drum but at a slower speed. This inner member comprises sleeves 90, 91 rotatably carried on the shaft 79 and end plates 92, 93 fixed to the sleeves 90, 91 respectively. The sleeve 90 is driven by a sprocket 94 mounted therein. The sleeve 91 is driven from the sleeve 90 through a countershaft 95 rotatably mounted in the flanges 80, 81. A plurality of carriage-engaging pegs 98 is fixed in grooves 99 in each of the end plates 92, 93. In the particular embodiment shown herein, thirty pegs are fixed at each end of the inner member. The peg structure is shown in detail in FIGS. 11–14 which will be described hereinbelow.

A plurality of collector rings 100 is mounted in an insulating plate 101 carried on the sleeve 90. A corresponding plurality of brush holders 102 is mounted in a plate 103 fixed to the frame member 45. A similar set of collector rings and brush holders is fixed at the other end of the shaft 79. These brushes and collector rings provide for conduction of electric current to the rotating members and particularly to the wires 88.

A preferred structure for driving the drum and the inner member is shown in FIGS. 2 and 27. A sprocket 106 is mounted on the shaft 79 and drives the input 107 of a variable ratio transmission 108. The output 109 of the variable ratio transmission drives the sprocket 94 which, in turn, drives the inner member via the sleeve 90. The ratio control shaft 110 of the variable ratio transmission may be driven by hand or by a speed control unit 111, or by other suitable means. An input is provided for the speed control unit from the transmission output 109 via a belt 112 while the output of the speed control unit is coupled to the transmission by a belt 113. The speed control unit is shown in detail in FIGS. 22–26 which will be described hereinbelow.

Referring now to FIGS. 11–14, each of the carriages 87 has a roller 114 which rides in the groove 85, a pair of rollers 115 which ride in the groove 86 and a pair of rollers 116 which ride against the ring 84. The conductor 88 passes through an insulator 117 positioned in the carriage 87 and is clamped in a block 118 by a screw 119. A spring 120 positioned between the block 118 and the insulator 117 maintains tension in the wire 88. Ordinarily, the spring 120 is employed only at one end of the wire. The wire mounting structure for the other end is shown in FIG. 8 wherein the wire passes through an insulator 121 mounted in the carriage 87 and is clamped in a block 122 by a screw 123.

The wire carriages 87 position the wires 88 at the outer surface of the shell 78. A pair of carriages with the interconnecting wire will ride freely around the drum and normally will tend to collect at the lower side of the drum due to the action of gravity. The carriages and pegs are designed to engage each other as seen in FIGS. 11 and 14. Hence, rotation of the inner member which carries the pegs 98 will cause a pair of pegs to engage a pair of carriages at the lower side of the drum and rotate the carriages upward at the rate of rotation of the inner member. The pair of carriages and the transverse wire will continue to rotate at the rate of the inner member until the point where the belt 35 presses the web 32 against the wire is reached. At this time, the belt will clamp the wire to the outer surface of the drum causing the wire and its carriages to rotate at the rate of the drum, moving the carriages ahead of and out of engagement with the pegs. The wire and its carriages will continue to rotate at the rate of the drum until the point at which the belt leaves the drum is reached. At this time, the wire and carriages will lag behind the rotating members until the carriages are again engaged by the pegs. It is seen that the lineal distance between the wires clamped to the outer drum by the belt is a function of the rate of rotation of the inner member. Hence, the spacing between wires can be varied by varying the relative speeds of the inner member and the drum.

With the structure shown in FIGS. 11 and 14 where all the pegs have all the same shape and all the carriages have the same shape, the maximum speed differential is limited by the distance between pegs on the inner member since a carriage cannot advance more than the distance between successive pegs during one revolution of the drum. In order to provide a greater variation in relative speeds and, hence, in spacing between wires, the construction of FIGS. 11, 12 and 13 is provided. With thirty pegs provided at each of the inner member, ten have the shape of the peg 98 of FIG. 11, ten have the shape of the peg 98A of FIG. 12 and ten have the shape of the peg 98B of FIG. 13. Similarly, ten of the carriages have the shape of the carriage 87 of FIG. 11, ten have the shape of the carriage 87A of FIG. 12 and ten have the shape of the carriage 87B of FIG. 13. The three styles of carriages are alternately positioned around the carriage rings and the three styles of pegs are alternately positioned around the end plates. The peg 98 will pass by the carriages 87A and 87B and will only engage the carriages 87. Similarly, the peg 98A will only engage the carriages 87A and the pegs 98B will only engage the carriages 87B. This construction provides a relatively large number of wires so that the minimum distance between wires will be relatively small while at the same time permitting a large variation in spacing between wires, the maximum change in spacing being the distance between three successive pegs rather than the distance between adjacent pegs. For example, in the particular embodiment disclosed herein, the periphery of the drum is about ten feet. With thirty wires, the minimum spacing between wires, with the inner member running at the same speed as the outer member or drum, is four inches. (If all of the pegs are the same and all of the carriages are the same, the maximum increase in spacing is four inches, providing a range of four inches to eight inches. Using the three coded pegs of FIGS. 11–13, the maximum spacing is increased to three times the minimum distance between wires, providing a spacing variation of four inches to sixteen inches.)

While gravity may be relied upon to restrain movement of the carriages relative to the outer drum after release of the wires by the belt, it is preferred to provide some type of brake for restricting movement of the carriages. This is especially desirable in the preferred embodiment of the machine since the portion of the revolution during which the wires are not clamped to the drum by the belt is quite small and the brake serves to overcome the momentum of the carriages in this small distance. A preferred form of brake structure is shown in FIGS. 5 and 6 wherein a plurality of individual braking units 130 are mounted in an arcuate arrangement on a plate 131 carried from the frame member 46. Each braking unit comprises a block 132 fixed to the plate 131 and a shoe 133 pivotally mounted in the block. A spring 134 is positioned between the block 132 and the shoe 133, urging the shoe in the counterclockwise direction as shown in FIG. 5. When extended, the shoe frictionally engages the outer surface of the carriage 87 to restrict movement of the carriage. In the preferred embodiment of the invention shown herein, eight braking units are used in sequence to permit braking of a number of carriages at once. This particular design of braking unit will fully stop motion of the carriages while providing very little load on the inner member when a carriage is engaged by a peg to be moved past the braking unit.

The apparatus described above may typically be used to make plastic bags in a continuous process from a web of thermoplastic material. In the particular form illustrated, the web 32 comprises a flat tube of heat-sealable polyethylene film. A conventional slitting device 140 may be mounted on the frame members 47, 48 to slit the tube along the center line 141 into two parts. The slitting operation may be carried out prior to or subsequent to the heat-sealing step. An electric current is coupled to each of the wires 88 via the brushes 102 and collector rings 100 to heat the wires to an appropriate temperature for sealing the layers of film together. The web is pressed against the heated wires by the belt as the web travels around the drum 34 producing sealing of the layers of the web along the transverse line 142 to produce bags having a folded bottom, sealed sides 142 and an open top 141. The machine may be operated so that the individual bags are severed along the sealing lines 142 to produce individual bags. Alternatively, the machine may be operated so that the layers are sealed together but are not severed. The machine may also be operated in a manner to be described to produce a perforated seal so that the web is maintained continuous but producing bags or other articles which are easily separated from each other.

Bags of a particular width are manufactured on the machine by setting the relative speeds of the inner member and outer drum. The size of the bag can be changed by changing the speed of the inner drum without stopping the machine or even changing the speed of the outer drum and belt. Furthermore, the apparatus permits selection of any width of bag within the operating range of the machine since the size variation is continuous rather than being in discrete steps. The machine may also be used with preprinted webs which require sealing and/or severing at predetermined points along the web. Proper registry of the sealing electrodes is easily achieved by varying the speed of the inner member with respect to the outer drum. A particular registry control system is illustrated in FIGS. 19–21 for operation in conjunction with the speed control unit 111. A tube 145 is carried on a shaft 146 which rides in brackets 147, 148 fixed to the frame members 47, 48, respectively. Gear racks 149 are carried in the brackets 147, 148 and mating pinions 150 are carried on the shaft 146 for moving the tube 145 along the slot 151. A roller 152 is mounted on a shaft 153 carried in brackets 154, 155 suspended from the tube 145. The brackets 154, 155 are slotted permitting adjustment of the position of the shaft 163 therein. A registration mark sensing unit 156 is carried by a bracket 157 suspended from the tube 145. A slot 158 is provided in the sensing unit 156 permitting the web 32 to be passed over the roller 152 and through the slot 158, the roller providing for raising the web from the belt 35. Two spaced sensing elements are provided in the sensing unit. Typically, each sensing element includes a light source 160 and a photocell 161. Registry marks 162 are provided on the web 32 at the desired spacing. The registry marks may take various forms but for the photocell system illustrated herein, the marks should be opaque.

In the operation of the machine, the relative speeds of the inner member and the drum are set to provide an electrode spacing corresponding to that required for the nominal spacing of the registry marks. A switch 163 is mounted on the plate 131 so as to be actuated by each wire carriage 87 as the carriage is moved therepast by a peg 98 (FIG. 6). Thus the switch 163 is actuated as a function of the speed of the inner member. Actuation of the switch 163 energizes the lamps 160 of the mark sensing unit. The sensing unit is initially positioned by rotation of the shaft 146 to place a registry mark 162 between the two sensing elements when the lamps are energized. Then both photocells will be energized simultaneously and there will be no output from the sensing unit. If during operation of the machine, there is a variation in size of the web, the position of a registry mark at the time the lamps are energized will change to block or partially block one of the photocells. When one photocell is energized and the other is not energized, a speed change signal is generated and the ratio change input 110 of the transmission unit 108 is correspondingly changed. This produces a change in speed of the inner member and, hence, varies the position of the electrodes relative to the web to bring the electrodes in registry with the web.

While various devices may be used to actuate the ratio change input of the transmission as a function of the speed change signals produced by the registry mark sensing unit, a preferred form of speed control unit is shown in FIGS. 22–26.

The speed control unit includes a housing 170, an input shaft 171 driven by the belt 112, and an output shaft 172 driving the belt 113. A first countershaft 173 is driven from the input shaft 171 through gears 174, 175. A second countershaft 176 drives the output shaft 172 through a sprocket 177, a chain 178 and another sprocket 179. The input shaft 171 is coupled to the output shaft 172 by a normally disengaged electromagnetic clutch 180. The countershaft 173 is coupled to the countershaft 176 by a normally disengaged electromagnetic clutch 181.

The input shaft 171 is driven continuously from the output of the variable speed transmission 108. The output shaft 172 is normally stationary. Energization of the clutch 180 couples the shaft 171 directly to the shaft 172 for changing the output speed of the transmisison unit and, hence, the speed of the inner member in one direction. Similarly, energization of the clutch 181 connects the shaft 171 to the shaft 172 through the two countershafts and changes the speed of the inner member in the opposite direction. In the embodiment shown herein, the clutch 180 is energized for a speed increase and the clutch 181 is energized for a speed decrease.

A shaft 183 is driven by the output shaft 172 through gears 184, 185. A block 186 is mounted on a helically threaded portion 187 of the shaft 183, with a fixed rod 188 passing through an opening in the block so that the block is traversed along the rod by rotation of the shaft. A normally closed switch 189 is mounted on the housing adjacent one end of the rod 188. Another normally closed switch 190 is mounted on a bracket 191. A shaft 192 is journalled in the bracket 191 and carries a pinion gear 193 for engaging a gear rack 194 so that rotation of the shaft will traverse the switch parallel to the rod 188. The switches 189, 190 function as limit switches to control the minimum and maximum speed differentials respectively between the inner member and the drum.

A cam 200 is mounted on the shaft 183 for rotation therewith. A pin 201 carried by the cam engages stop members 202, 203 for limiting rotation of the cam. A friction clutch comprising a plurality of washers 204 and a spring 205 urges the cam 200 against a bearing 206 to produce rotation of the cam in synchronism with the shaft 183 except when the cam pin 201 is engaging one of the stops. Switches 210, 211 are mounted on opposite sides of the cam and the cam is designed so that both switches are open when the cam is in the centered position.

An electrical diagram of the speed control unit is shown in FIG. 26, with all of the switches in their normal positions. The speed control unit may be energized by push buttons 212, 213 and by relay contacts 214, 215. The relays for the contact sets 214, 215 are usually energized by the speed change signals from the photocells 161. Actuation of the push button 212 or the contacts 214 energizes a switch 216 and connects power to the clutch 180 through a rectifier 217. As described previously, energization of the clutch causes the output shaft 172 to rotate and change the speed setting of the transmission unit 108. The clutch will remain energized until the push button or relay is released or until the limit switch 189 is opened. If the shaft 183 is rotated more than a quarter revolution during this time, the cam will close the switch 211. Then when the switch 216 is de-energized, the clutch 181 will be energized through a rectifier 218 producing a small amount of rotation of the shaft 172 in the opposite direction and returning the cam 200 to the centered condition.

Operation of the speed control unit in the opposite direction is achieved by energizing the switch 219 via the push buttons 213 or the relay contacts 215.

The machine of the invention may be used to seal layers of thermoplastic material together at designated points. Alternatively, it may be used to sever the web of thermoplastic material to provide separate articles. Also, it may be used to seal layers of material together and sever the sealed layers at the seal. In the heat sealing of thermoplastic materials, problems are always encountered in the formation of fluid-tight seals which are durable and which will remain fluid-tight during use. The present invention contemplates new and novel processes for forming seals in thermoplastic material. The sealing electrodes are moved along a closed path and the web of thermoplastic material is moved along a first portion of this path with the thermoplastic material pressed into contact with the electrodes. In the embodiment disclosed herein, the electrodes move in a circular path defined by the drum 34 and the web of material is maintained in contact with the electrodes by the belt 35. The first portion of the path during which contact is maintained comprises more than three quarters of the path. During the remaining portion of the path, i.e., approximately twenty percent of the total path length, the electrodes are heated to a high temperature which temperature is greater than that necessary to effect the desired seal in the material. The heat sealing is achieved when the thermoplastic web is pressed against the hot electrode by the belt. The length of the first portion of the path and the heat loss to the belt are selected so that the electrode temperature drops as the electrode traverses the first portion of the path to provide cooling of the seal and completely solidify the seal prior to leaving the drum. Thus, there are no stresses imposed on the seal while in a fluid or plastic state which would result in weak spots or openings in the seal. The process is most often used in sealing relatively thin material, i.e., material in the range of one-half mil to five mils thickness. In such operation, the heat-sealing electrodes are continuously energized at a fixed current. An electrode is heated to a relatively high temperature during the small portion of the path when the electrode is out of engagement with the belt. Then the electrode produces the heat seal on contact with the thermoplastic material but is cooled by heat loss to the belt. The heat input to the electrode from the electric power source is such that the heat loss to the belt maintains the electrode below the heat-sealing temperature.

With heavier materials, such as ten mils thickness, a higher heat input is required to effect the seal in the thermoplastic material. For thicker material, the temperature control of the elctrodes is achieved by varying or pulsing the current to the electrodes. The current will be connected to the electrode during the remaining portion of the path when the belt is not in engagement with the electrode and during the initial section of the first portion of the path when the electrode is in engagement with the web and belt. This current will heat the electrode to the temperature necessary to effect the seal. The current will be shut off for the rest of the first portion of the path permitting the electrode and the seal to cool by heat loss to the belt. Thus, the same temperature cycling for the electrode and seal is achieved as with the thinner thermoplastic material previously described.

This process wherein a high heat is initially applied to the thermoplastic material after which the material is cooled before leaving the drum produces a fluid-tight, hard seal which is rugged and durable and meets exacting packaging requirements.

A perforated seal may be formed by the present invention. The perforated seal is desired in many uses. Bags or similar articles can be made with fluid-tight seals and can be removed from the machine in a continuous strip with the individual bags being easily separated at the perforated seal at a later time. When the indivdual articles are completely severed at the seal as in earlier operations, the indivdual articles are difficult to handle in large quantities. With this perforated seal, the articles can be collected in a roll for transportation to another location and be separated by manual means or other machines for subsequent use.

A flexible belt having an irregular or textured surface is utilized in forming the perforated seal. Typically, a fabric-reinforced rubber belt is utilized with the web of thermoplastic material lying against the fabric face of the belt. Each electrode 88 is covered with a high-temperature-resistant fabric-reinforced plastic sheet. A typical arrangement is shown in FIG. 17 with two strips 222, 223 sealed together at their edges to form a tube for receiving the electrode 88. Typically, the high-temperature-resistant material may be a sheet of plastic such as Teflon or the like formed with a fabric of fiber glass or similar material. The web of thermoplastic material is pressed between the fabric backing of the belt and the covered electrode resulting in a seal such as that illustrated in FIG. 18. The heat seal is formed at the horizontal strip 224 and provides a tear line across the sheet. The irregular backing surfaces which compress the thermoplastic material produce local hot spots in the seal, causing a zone of weakness along the tear line. The resulting seal is easily separated along the tear line but is fluid-tight at both edges, the hot spots occurring along the center of the seal rather than at the edges.

It has been found that during the heat sealing of thermoplastic materials, bits of the material tend to adhere to the sealing electrodes. A conventional brushing arrangement is provided in the apparatus of the invention for cleaning the electrodes during the portion of the cycle when an electrode is not in engagement with the web. A preferred form of the brushing structure is seen in FIGS. 1, 2, 6 and 7 wherein a track 230 serves as a guide for a flexible belt 231 which rides on pulleys 232, 233 with the pulley 232 driven from a motor 234. A plurality of brush sections 235 is mounted on the belt 231 for engaging the electrode wires 88 as the machine rotates.

The machine of the invention may be used to produce plastic bags and the like at very high rates. The particular machine shown herein operates in the speed range of 600 feet per minute to 840 feet per minute. As a typical example, when operating at a rate of 700 feet per minute, with polyethylene film one-half mil thick, bags ten inches wide can be produced at a rate of 68,800 bags per hour. The particular machine will handle a web up to forty-five inches in width. Hence, bags ten inches wide by fifteen inches deep can be made three at a time providing an output of 200,000 bags per hour. While operating at this high rate, the size of the bags can be changed as desired and the registry of the sealing with preprinted bag material can be continuously controlled.

Although exemplary embodiments of the invention have ben disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for forming articles from a web, the combination of: first and second concentric members; means for rotating said members in the same direction at different rates of rotation, with said first member moving slower than said second member; means for feeding a web of material to said second member and clamping the web against an outer surface of said second member during a portion of a revolution; a plurality of article-forming dies extending along said outer surface of said second member, with each of said dies driven by said first member from a reference position in the direction of rotation of said members; and means for clamping each of said dies to said second member in engagement with the web during said portion of a revolution, so that a die is driven by said first member at its reference position to be clamped against said second member after which the die is carried by said second member at a higher rate until released to lag behind both members returning to its reference position.

2. In an apparatus for forming articles from a web, the combination of: first and second concentric members; means for rotating said members in the same direction at different rates of rotation, with said first member moving slower than said second member; a flexible belt; means for wrapping said belt about a portion of said second member for engaging the outer surface thereof; means for feeding a web of material between said belt and said outer surface, with said belt clamping said web against said outer surface; and a plurality of article-forming dies extending along said outer surface of said second member for clamping against said outer surface by said belt, with each of said dies driven by said first member from a reference position in the direction of said members, so that a die is driven by said first member at its reference position to be clamped against said second member by said belt after which the die is carried by said second member at a higher rate until released by said belt to lag behind both members returning to its reference position.

3. In an apparatus for forming articles from a web, the combination of: first and second concentric members; means for rotating said members in the same direction at different rates of rotation, with said first member moving slower than said second member; means for feeding a web of material to said second member and clamping the web against the outer surface of said second member during a portion of a revolution; a plurality of article-forming dies extending along said outer surface of said second member, with each of said dies driven by said first member from a reference position in the direction of said members; means for clamping each of said dies to said second member in engagement with the web during said portion of a revolution, so that a die is driven by said first member at its reference position to be clamped against said second member after which the die is carried by said second member at a higher rate until released to lag behind both members returning to its reference position; and means for varying the speed of one of said members relative to the other for varying the spacing of dies along the periphery of said second member.

4. In an appartus for forming articles from a web having registration marks thereon, the combination of: inner and outer concentric members; means for rotating said members in the same direction at different rates of rotation, with said inner member moving slower than said outer member; means for feeding a web of material to said outer member and clamping the web against the outer surface of said outer member during a portion of a revolution; a plurality of article-forming dies extending along said outer surface of said outer member, with each of said dies driven by said inner member from a reference position in the direction of rotation of said members; means for clamping each of said dies to said outer member in engagement with the web during said portion of a revolution, so that a die is driven by said inner member at its reference position to be clamped against said outer member after which the die is carried by said outer member at a higher rate until released to lag behind both members returning to its reference position; registration mark sensing means positioned at said web for generating a speed change signal when a mark is out of register; means for energizing said sensing means as a function of the speed of said inner member; and means for varying the speed of one of said members relative to the other as a function of said speed change signal for varying the spacing of dies along the periphery of said outer member.

5. In an apparatus for forming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of heat-sealing electrodes riding on said outer drum and extending along said outer surface thereof for clamping against said outer surface by said belt, with each of said electrodes engageable with said inner drum at a reference position for driving by said inner drum in the direction of rotation of said drums; and means coupling an electric current through each of said electrodes.

6. In an apparatus for forming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of pairs of electrode carriages riding on said outer drum, with the carriages of each pair at opposing ends of said outer drum; and a plurality of heat-sealing electrodes extending across said outer surface, with an electrode mounted between each pair of carriages, said inner drum having a plurality of circumferentially spaced carriage-engaging pegs for engaging and driving a pair of carriages at the rate of said inner drum to a position where the electrode thereof is clamped to said outer drum to move such pair at the rate of said outer drum until released.

7. In an apparatus for forming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of pairs of wire carriages riding on said outer drum, with the carriages of each pair at opposing ends of said outer drum; a plurality of wires extending across said outer surface, with a wire mounted between each pair of carriages; and means carried on at least one carriage of each of said pairs for maintaining the wire carried thereby in tension, said inner drum having a plurality of circumferentially spaced carriage-engaging pegs for engaging and driving a pair of carriages at the rate of said inner drum to a position where the wire thereof is clamped to said outer drum to move such pair at the rate of said outer drum until released.

8. In an apparatus for forming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of pairs of electrode carriages riding on said outer drum, with the carriages of each pair at opposing ends of said outer drum; a plurality of heat-sealing electrodes extending across said outer surface, with an electrode mounted between each pair of carriages, said inner drum having a plurality of circumferentially spaced carriage-engaging pegs for engaging and driving a pair of carriages at the rate of said inner drum to a position where the electrode thereof is clamped to said outer drum to move such pair at the rate of said outer drum until released; and carriage-restraining means for engaging said carriages at a zone of a revolution where said belt is out of engagement with said outer drum for maintaining a carriage substantially stationary until engaged by an inner drum peg.

9. In an apparatus for froming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of heat-sealing electrodes riding on said outer drum and extending along said outer surface thereof for clamping against said outer surface by said belt, with each of said electrodes engageable with said inner drum at a reference position for driving by said inner drum in the direction of rotation of said drums; and means for energizing each of said electrodes during the period of driving by said inner drum and for the first portion of the period of driving by said outer drum.

10. In an apparatus for forming laminar articles from a multilayer web of thermoplastic material, the combination of: inner and outer concentric drums; means for rotating said drums in the same direction at different rates of rotation, with said inner drum moving slower than said outer drum; a flexible belt; means for wrapping said belt about a portion of said outer drum for engaging the outer surface thereof; means for feeding a web of material between said belt and said outer surface, with said belt clamping said web against said outer surface; a plurality of pairs of electrode carriages riding on said outer drum, with the carriages of each pair at opposing ends of said outer drum and with successive carriages having differently positioned driving surfaces; and a plurality of heat-sealing electrodes extending across said outer surface, with an electrode mounted between each pair of carriages, said inner drum having a plurality of circumferentially spaced pegs for engaging the driving surfaces of said carriages, with successive pegs adapted to engage corresponding carriages and clear intervening carriages, for engaging and driving a pair of carriages at the rate of said inner drum to a position where the electrode thereof is clamped to said outer drum to move such pair at the rate of said outer drum until released.

11. In an apparatus for forming articles from a web, the combination of: inner and outer concentric members; means for rotating said members in the same direction at different rates of rotation, with said inner member moving slower than said outer member; a flexible belt formed with a fabric at one surface thereof; means for wrapping said belt about a portion of said outer member, with said one surface of said belt facing the outer surface of said outer member; means for feeding a web of material between said belt and said outer surface, with said belt clamping said web against said outer surface; a plurality of heat-sealing wires extending along said outer surface of said outer member for clamping against said outer surface by said belt, with each of said wires driven by said inner member from a reference position in the direction of rotation of said member; means for coupling an electric current to each of said wires; and a covering positioned over each of said wires, said covering comprising a high temperature resistant fabric reinforced plastic sheet.

12. In an apparatus for forming articles from a web having registration marks thereon, the combination of: inner and outer concentric members; means for rotating said members in the same direction at different rates of rotation, with said inner member moving slower than said outer member; means for feeding a web of material to said outer member and clamping the web against the outer surface of said outer member during a portion of a revolution; a pair of mark-sensing units spaced from each other along the line of travel of the web, with said marks passing said units; a plurality of article-forming dies extending along the outer surface of said outer member, with each of said dies driven by said inner member from a reference position in the direction of rotation of said members; means for clamping each of said dies to said outer member in engagement with the web during said portion of a revolution, so that a die is driven by said inner member at its reference position to be clamped against said outer member after which the die is carried by said outer member at a higher rate until released to lag behind both members returning to its reference position; first control means for intermittently energizing said sensing units in synchronism with driving of a die by said inner member, with each sensing unit generating a speed change signal when a mark is present during energization of the unit; and second control means for varying the speed of said inner member relative to said outer member as a function of said speed change signals for maintaining the die spacing along the outer member in synchronism with the marks of the web.

13. In an apparatus for forming articles from a web having registration marks thereon, the combination of: inner and outer concentric members; means for rotating said members in the same direction at different rates of rotation, with said inner member moving slower than said outer member; a flexible belt; means for wrapping said belt about a portion of said outer member for engaging the outer surface thereof; means for feeding a web of material between said belt and said outer surface, with said belt clamping said web against said outer surface; a pair of mark-sensing units spaced from each other along the line of travel of the web, with said marks passing said units; a plurality of article-forming dies extending along said outer surface of said outer member for clamping against said outer surface by said belt, with each of said dies driven by said inner member from a reference position in the direction of rotation of said members, so that a die is driven by said inner member at its reference position to be clamped against said outer member by said belt after which the die is carried by said outer member at a higher rate until released by said belt to lag behind both members returning to its reference position; first control means for intermittently energizing said sensing units in synchronism with driving of a die by said inner member, with each sensing unit generating a speed change signal when a mark is present during energization of a unit; and second control means for varying the speed of said inner member as a function of said speed change signals without affecting the speed of said outer member, belt and web, for maintaining the die spacing along said outer member in synchronism with the marks of the web.

14. In an apparatus for forming articles from a web, the combination of: inner and outer concentric members; means for rotating said members in the same direction at different rates of rotation, with said inner member moving slower than said outer member; means for feeding a web of material to said outer member and clamping the web against the outer surface of said outer member during a portion of a revolution; a plurality of article-forming dies riding on said outer member and extending along said outer surface of said outer member, each of said dies having a coded drive surface, with successive dies having different codes, and with said inner member having a plurality of die-driving pegs positioned for engaging said die-drive surfaces in driving relation, with successive pegs positioned to engage differently coded dies permitting a die to move past an unmatched peg without engagement; and means for clamping each of said dies to said outer member in engagement with the web during said portion of a revolution, with a die being driven by engagement with a peg of said inner member to be clamped against said outer member after which the die is carried by said outer member at a higher rate until released to lag behind both members until again engaged by the peg.

15. In an apparatus for forming articles from a web, the combination of: inner and outer concentric members; first means for rotating one of said members; a variable speed transmission having a power input, a power output, and a ratio control input for varying the transmission ratio, with said power input driven by said one member and said power output driving the other of said members in the same direction, with said inner member moving slower than said outer member; means for feeding a web of material to said outer member and clamping the web against the outer surface of said outer member during a portion of a revolution; a plurality of article-forming dies extending along said outer surface of said outer member, with each of said dies driven by said inner member from a reference position in the direction of rotation of said member; means for clamping each of said dies to said outer member in engagement with the web during said portion of a revolution, so that a die is driven by said inner member at its reference position to be clamped against said outer member after which the die is carried by said outer member at a higher rate until released to lag behind both members returning to its reference position; a speed control unit having an input driven by said one member and an output coupled to said ratio control input; first and second clutch means in said speed control unit for coupling the input thereof to the output for forward and reverse operation respectively; and a control signal source for selectively energizing said clutches for changing the speed of said inner member relative to said outer member.

References Cited in the file of this patent

UNITED STATES PATENTS

| | | |
|---|---|---|
| 2,670,783 | Moravec et al. | Mar. 2, 1954 |
| 2,680,471 | Mercer | June 8, 1954 |
| 2,708,648 | Ulmschneider | May 17, 1955 |
| 2,732,887 | Drew | Jan. 31, 1956 |
| 2,735,797 | Schjeldahl | Feb. 21, 1956 |
| 2,904,100 | Fener | Sept. 15, 1959 |
| 2,984,288 | Gaubert | May 16, 1961 |